United States Patent Office 3,328,426
Patented June 27, 1967

3,328,426
PROCESS FOR THE MANUFACTURE OF
CYCLIC ETHERS
Gunther Ohloff, Beauvent, Bernex, Switzerland, assignor to Firmenich & Cie, Geneva, Switzerland
No Drawing. Filed Mar. 25, 1965, Ser. No. 442,810
Claims priority, application Switzerland, Mar. 26, 1964, 3,966/64
10 Claims. (Cl. 260—345.1)

The present invention relates to a new process for the manufacture of cyclic ethers, in particular of 4-methyl-2-(2-methyl-1-propen-1-yl)-tetrahydropyran (I) and 4-methyl - 2 - (2 - methyl-1-propen-1-yl)-dihydropyran (II) which are known compounds having interesting odoriferous properties and which are useful in the perfume industry.

The first method which has been used for preparing compound I consists in brominating citronellyl acetate by means of N-bromosuccinimide, converting the resulting mixture of citronellyl acetate monobromides into a mixture of diene acetates by dehydrobromination, saponifying the diene acetates by a treatment with alkali in order to form a mixture of 3,7-dimethyl-4,6-octadien-1-ol and 3,7-dimethyl-5,7-octadien-1-ol, and cyclizing these alcohols by the action of acidic agents (cf. C. F. Seidel et al., Helv. Chim. Acta 44, 598 (1961)). The yields of compound I which can be obtained by this method are low and amount to about 5 to 10% only, based on citronellyl acetate.

Another known method (cf. G. Ohloff et al., Angew. Chem. 73, 578 (1961)) by which compounds I and II can be prepared consists in converting β-citronellol into its two hydroperoxides by a photosensitized oxidation in the presence of rose bengale, reducing the hydroperoxides by means of sodium sulfite in order to form a mixture of 2,6-dimethyl - 3 - octen-2,8-diol and 2,6-dimethyl-1-octen-3,8-diol, and cyclizing the former of these diols by the action of acidic agents. In this method compounds I and II are obtained in yields of about 50%, based on β-citronellol. A drawback of this method resides in the fact that relatively small quantities only, e.g. of the order of 1 kg. of β-citronellol can be subjected at a time to the irradiation required for the oxidation. If the layer of the β-citronellol solution subjected to the irradiation is too thick, the time of irradiation will be so long that side reactions occur and poor yields of hydroperoxides are obtained.

According to the present invention the compounds I and II are prepared by reacting 2,6-dimethyl-2,3-epoxy-octan-8-ol or 2,6-dimethyl-2,3-epoxy-cis-6-octen-8-ol with a secondary amine in order to open the epoxy nucleus and introduce a secondary amino group into position 3, oxidizing the resulting amino-alcohols in order to form 3-N,N-disubstituted 2,6-dimethyl - 3 - amino-octan-2,8-diol 3-N-oxide or 3-N,N-disubstituted 2,6-dimethyl-3-amino-6-cis-octen-2,8-diol 3-N-oxide, and subjecting the N-oxides to a cyclizing pyrolysis. It is advisable to treat the product of the pyrolysis by acidic agents in order to remove basic impurities which may be present and to obtain the cyclic ethers in an olfactorily pure form.

This synthesis can be illustrated by the following scheme:

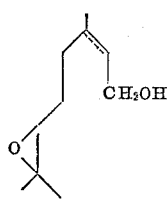

III

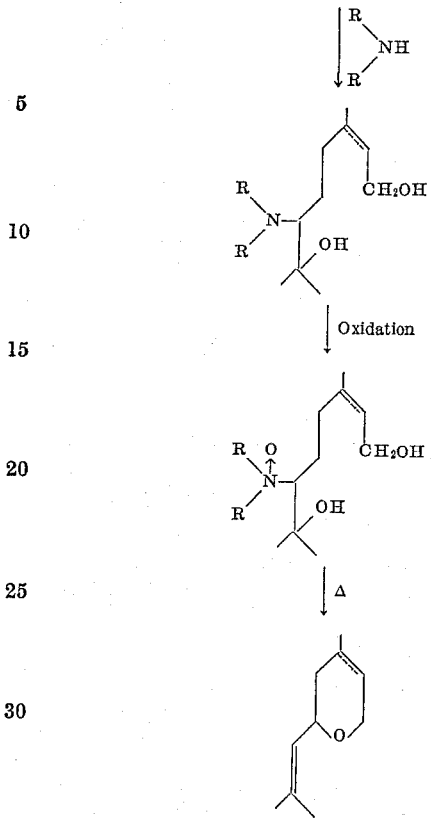

I and

In the above formulae R represents hydrocarbon radicals, in particular alkyl, cycloalkyl, aralkyl or aryl radicals. R can be e.g. methyl, ethyl, propyl, isopropyl, butyl, isobutyl, hexyl, benzyl, phenyl, etc. The substituents of the amino group represented by R can be the same or different from each other. They can furthermore be linked together, possibly by heteroatoms, and form a heterocyclic radical together with the N-atom. The nucleus of the heterocyclic radical may also be condensed with a carbocyclic nucleus. The $(R)_2N$-group can, thus, be e.g. a group derived from piperidine, pyrrolidine, pyrrol, indole, morpholine, tetrahydroquinoline, decahydroquinoline, etc.

The process according to the invention can be carried out easily by means of conventional equipment and gives yields which are substantially higher than those obtained by any known method. Thus, compounds I and II are obtained in yields of 70 to 80%. A further advantage of the new process results from the fact that the crude end products have a high purity and are thus easily convertible into olfactorily pure finished products by simple and inexpensive methods.

The reaction between 2,6-dimethyl-2,3-epoxy-octan-8-ol or 2,6-dimethyl-2,3-epoxy-6-cis-octen-8-ol and the secondary amine can be brought about by heating the reactants at elevated temperatures, e.g. between 100° and 150° C. The reaction results in the opening of the epoxide nucleus of the starting alcohol with formation of a hydroxyl group in the 2-position and introduction of a disubstituted amino group in the 3-position. Secondary amines which can be used for carrying out the first step of the process include, for instance, lower dialkylamines such as dimethylamine, diethylamine, di-n-propylamine or di-n-butylamine; diphenylamine, methylaniline, piperidine, pyrrolidine, morpholine, tetrahydroquinoline, decahydroquinoline, etc. If a volatile secondary amine is used, the amination reaction can be carried out either in a closed vessel at the pressure developed by heating the reactants or in a reaction medium consisting of a less volatile solvent at reflux temperature and at ordinary pressure. Particularly good results are obtained when lower dialkylamines, for instance dimethylamine or diethylamine, are used for the amination reaction. The amine diol forms very easily and in high yields which, depending on the secondary amine used, can be practically quantitative.

The formation of the amine oxides V by oxidation of the amine diols IV proceeds smoothly and with high yields which are often practically quantitative. It is advantageous to use hydrogen peroxide as the oxidation agent since it does not form any disturbing by-products in the oxidation. However, other oxidation agents having the same oxidative activity as $H_2O_2$ can also be used. The oxidation by means of $H_2O_2$ is conveniently carried out in an alcoholic, e.g. methanolic or ethanolic solution at low temperatures, e.g. at 0° C. or below. The amine oxide V obtained by conventional treatment of the oxidation mixture can be directly subjected to pyrolysis without any further purification.

The pyrolysis of the amine oxides V is conveniently carried out under reduced pressure at tempeatures of at least 100° C. A convenient mode of operation consists in introducing the amine oxide dropwise into a flask maintained at a reduced pressure and heated to the decomposition temperature of the amine oxide, and removing the pyrolysis product by distillation as it forms. It is advisable to wash the pyrolysis product with an acid, e.g. a dilute inorganic acid such as $H_2SO_4$, in order to remove basic nitrogen-containing impurities and to obtain the cyclic ethers I and II in an olfactorily pure form as required in prefumery. The yields of the pyrolysis reaction are also very good and on average exceed 80%.

The amine diols IV and the amine oxides V are compounds which have not been described in the literature and which are valuable intermediates. These intermediates are also within the scope of this invention.

The epoxides of Formula III can be readily prepared in high yields by treating citronellol and nerol, respectively, with peracetic acid. By using an excess of about 30% of peracetic acid citronellol can be converted in a practically quantitative yield (99%) into its 2,3-epoxide.

According to the present invention it is possible to manufacture e.g. optically active or racemic 4-methyl-2-(2-methyl-1-propen-1-yl)-tetrahydropyran in yields of e.g. 70 to 80% if citronellol is used as the starting material. These values are far beyond the yields which are obtained by the methods of the prior art.

The invention is further illustrated by the following examples without being limited thereto.

*Example 1*

172 g. (1 mole) of (+)-2,6-dimethyl-2,3-epoxy-octan-8-ol [$d_4^{20}$=0.940; $n_D^{20}$=1.455; $\alpha_D^{20}$=+2.2] were heated for 96 hours in an autoclave at 150° C. together with 50 g. (1.1 mole) of dimethylamine (100%). The reacton product was then distilled in a high vacuum and at a constant boiling temperature. Practically no residue was left. There were obtained 208 g. (96.3% of the theory) of 2,6 - dimethyl - 3 - dimethylamino - octan - 2,8 - diol. B.P.$_{0.01}$=124–126° C.; $n_D^{20}$=1.470. Nitrogen content, calculated from $C_{12}H_{27}NO_2$:6.45%; found: 6.46 and 6.27%.

To a solution of 108.5 g. (0.5 mole) of 2,6-dimethyl-3-dimethylamino-octan-2,8-diol in 110 ml. of methanol there were added within 40 minutes, while cooling with ice and stirring vigorously, 75 g. (0.75 mole) of a 34% aqueous $H_2O_2$ solution. The reaction mixture was then slowly heated to room temperature and allowed to stand for 24 hours. The phenolphthalein test for amines was then negative. The excess $H_2O_2$ was then destroyed by the addition of 0.5 g. of platinum black and stirring for 3 hours. After filtering off the catalyst the solvents were separated in a rotatory evaporator. 115.5 g. of a syrupy residue were obtained. As analyses showed, it consisted of 2,6 - dimethyl - 3 - dimethylamino - octan - 2,8 - diol 3-N-oxide. The yield was 99% of the theory.

The N-oxide was then directly subjected to pyrolysis without any purification. 100 g. of the syrupy oxidation product were introduced dropwise into a flask heated to 150° C. and which was connected with a distillation equipment maintained under a vacuum of 10 Torr. 64 g. of a mixture of the cis- and trans-isomers of (+)-4-methyl-2 - (2 - methyl - 1 - propen - 1 -yl) - tetrahydropyran were collected in the receiver. Yield: 84.1% of the theory.

In order to remove the last traces of malodorous basic by-products the pyrolysis product was extracted once with 2% aqueous sulfuric acid. The purified product had the following physical constants: B.P.$_{.12}$=56° C.; $d_4^{20}$=0.8755; $n_D^{20}$=1.4565; [$\alpha$]$_D^{20}$=+25.8°.

*Example 2*

172 g. (1 mole) of (−)-2,6-dimethyl-2,3-epoxy-octan-8-ol [$\alpha_D^{20}$=−4.0°] were heated for 60 hours at 150° C. in an autoclave together with 1000 ml. of an aqueous 25% dimethylamine solution. The excess dimethylamine was removed from the reaction product by distillation in a rototary evaporator. The residue yielded, after distillation in a high vacuum, 186 g. of pure 2,6-dimethyl-3-N,N-dimethylamino - octan - 2,8 - diol. B.P.$_{0.01}$=125–127° C.; $n_D^{20}$=1.473; nitrogen content, calculated from

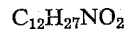

$C_{12}H_{27}NO_2$ 6.45%; found: 6.61%. Yield: 85.6% of the theory.

108.5 g. (0.5 mole) of the N,N-dimethylamino compound were reacted in the manner described in Example 1 in the same amount of methanol with 75 g. of a 34% aqueous $H_2O_2$ solution. When the phenolphthalein test was negative, the excess $H_2O_2$ was destroyed by the addition of 0.5 g. of platinum black, and after the usual treatment there were obtained 115.5 g. of 2,6-dimethyl-3-N,N-dimethylamino-octan-2,8-diol 3-N-oxide. Yield: 99% of the theory.

The pyrolysis of 100 g. of the N-oxide under the conditions set forth in Example 1 yielded 66 g. of (−)-4-methyl - 2 - (2 - methyl - 1 - propen - 1 - yl) - tetrahydropyran, corresponding to a yield of 87% of the theory. The traces of basic by-products were removed by extraction with 2% aqueous sulfuric acid. According to the gas-chromatographic analysis the purified product consisted of a mixture of the cis- and trans-isomers in a ratio of 53% of the cis-isomer to 47% of the trans-isomer. This mixture had the following constants: B.P.$_{.12}$=58° C.; $d_4^{20}$=0.8753; $n_D^{20}$=1.4564; [$\alpha$]$_D^{20}$=−42.2°.

*Example 3*

516 g. (3 moles) of racemic 2,6-dimethyl-2,3-epoxy-octan-8-ol were heated for 70 hours at 150° in the presence of 150 g. (3.3 moles) of dimethylamine in an autoclave. By distillation in a high vacuum there were obtained 615 g. of 2,6-dimethyl-3-N,N-dimethylamino-octan-2,8-diol, corresponding to a yield of 93% of the theory. The product had the following physical constants: B.P.$_{0.02}$=128–130° C.; $n_D^{20}$=1.471; nitrogen content, calculated from $C_{12}H_{27}NO_2$: 6.45%; found: 6.48 and 6.36%.

434 g. (2 moles) of the N,N-dimethylamino compound were reacted in the same quantity of methanol with 300 g. of a 34% aqueous $H_2O_2$ solution. After 24 hours solid $Na_2SO_3$ was added portionwise, while vigorously stirring and cooling, in order to destroy the excess $H_2O_2$. The mixture was then freed from water and methanol in a rotatory evaporator, and the N,N-dimethylamine oxide was separated from the solid residue by extraction with methylene chloride. After evaporation of the solvent there were obtained 448 g. of N,N-dimethylamine oxide, corresponding to a yield of 96% of the theory. 400 g. of N,N-dimethylamine oxide were subjected to a pyrolysis and treated in the manner described in the preceding examples. In this manner there were obtained 262 g. of racemic 4-methyl-2-(2-methyl-1-propen-1-yl)-tetrahydropyran as a mixture of the cis- and trans-isomers having the following constants: $B.P._{20}=68°$ C.; $d_4^{20}=0.8758$; $n_D^{20}=1.4567$; $[\alpha]_D^{20}=\pm 0°$.

*Example 4*

17 g. (0.1 mole) of 2,3-epoxy-nerol ($B.P._{0.7}=80-82°$ C.; $d_4^{20}=0.9601$; $n_D^{20}=1.4687$) containing about 30% of 2,6-dimethyl-6,7-epoxy-2-octen-8-ol as an impurity were heated for 80 hours in a bomb tube at 150° C. in the presence of 9 g. (0.2 mole) of dimethylamine. The reaction product was distilled in a high vacuum. Yield of 2,6 - dimethyl - 3 - N,N - dimethylamino - cis - 6-octen-2,8-diol: 20 g.=93% of the theory; $B.P._{0.05}=138-140°$ C.

18 g. of the obtained N,N-dimethylamino compound were oxidized in the manner described in Example 2. 19 g. of 2,6-dimethyl-3-N,N-dimethylamino-cis-6-octen-2,8-diol 3-N-oxide were obtained.

18.5 g. of the N-oxide were then subjected to a pyrolysis in vacuo without any preliminary purification in the manner described in the preceding examples. 8 g. of 4 - methyl - 2 - (2 - methyl - 1 - propen - 1 - yl)-dihydropyran (51% of the theory) were obtained after washing the reaction product with 2% aqueous sulfuric acid.

I claim:

1. A process for preparing 4-methyl-2-(2-methyl-1-propen-1-yl)-tetrahydropyran which comprises reacting 2,6-dimethyl-2,3-epoxy-octan-8-ol with a secondary amine in order to cause the opening of the epoxy ring, the formation of a hydroxyl group in the 2-position and the introduction of a secondary amino group in the 3-position of the starting alcohol, oxidizing the resulting 2,6-dimethyl-3-secondary-amino-octan-2,8-diol to form the corresponding N-oxide, and subjecting the resulting 2,6-dimethyl-3-secondary-amino-octan-2,8-diol 3-N-oxide to a cyclizing pyrolysis to form 4-methyl-2-(2-methyl-1-propen-1-yl)-tetrahydropyran.

2. The process according to claim 1 wherein there is used a secondary amine of the formula R—NH—R wherein R represents a member selected from the group consisting of alkyl, cycloalkyl, aralkyl and aryl radicals.

3. The process according to claim 1 wherein there is used a dialkylamine the alkyl groups of which comprise from 1 to 2 carbon atoms.

4. The process according to claim 1 wherein there is used a cyclic secondary amine.

5. The method according to claim 1 which comprises heating together 2,6-dimethyl-2,3-epoxy-octan-8-ol and dimethylamine at temperatures of at least 100° C. in a closed vessel, treating an alcoholic solution of the resulting 2,6-dimethyl-3-dimethylamino-octan-2,8-diol with $H_2O_2$, while cooling, in order to form 2,6-dimethyl-3-dimethylamino-octan-2,8-diol 3-N-oxide, treating the N-oxide at reduced pressure at temperatures of at least 100° C. and distilling the pyrolysis product as it forms, and washing the resulting product with an acid in order to remove malodorous basic impurities.

6. A process for preparing 4-methyl-2-(2-methyl-1-propen-1-yl)-dihydropyran which comprises reacting 2,6-dimethyl-2,3-epoxy-6-cis-octen-8-ol with a secondary amine in order to cause the opening of the epoxy ring, the formation of a hydroxyl group in the 2-position and the introduction of a secondary amino group in the 3-position of the starting alcohol, oxidizing the resulting 2,6 - dimethyl - 3 - secondary - amino - 6 - cis - octen-2,8-diol to form the corresponding N-oxide, and subjecting the resulting 2,6-dimethyl-3-secondary-amino-6-cis-octen-2,8-diol 3-N-oxide to a cyclizing pyrolysis to form 4-methyl-2-(2-methyl-1-propen-1-yl)-dihydropyran.

7. The process according to claim 1 wherein there is used a secondary amine of the formula R—NH—R wherein R represents a member selected from the group consisting of alkyl, cycloalkyl, aralkyl and aryl radicals.

8. The process according to claim 1 wherein there is used a dialkylamine the alkyl groups of which comprise from 1 to 2 carbon atoms.

9. The process according to claim 1 wherein there is used a cyclic secondary amine.

10. The method according to claim 1 which comprises heating together 2,6-dimethyl-2,3-epoxy-6-cis-octen-8-ol and dimethylamine at temperatures of at least 100° C. in a closed vessel, treating an alcoholic solution of the resulting 2,6 - dimethyl - 3 - dimethylamino - 6 - cis-octen-2,8-diol with $H_2O_2$, while cooling, in order to form 2,6 - dimethyl - 3 - dimethylamino - 6 - cis - octen - 2,8-diol 3-N-oxide, heating the N-oxide at reduced pressure at temperatures of at least 100° C. and distilling the pyrolysis product as it forms, and washing the resulting product with an acid in order to remove malodorous basic impurities.

References Cited

Ohloff et al.: Angew Chem., vol. 73, pp. 578–580 (1961).

Seidel et al.: Helv. Chim. Acta, vol. 44, pp. 598–600 (1961).

WALTER A. MODANCE, *Primary Examiner.*

J. M. FORD, *Assistant Examiner.*